July 5, 1955 — R. B. MERCHANT — 2,712,593

EDGE ILLUMINATED DIAL

Filed April 21, 1951 — 4 Sheets-Sheet 1

ROBERT B. MERCHANT
*INVENTOR.*

BY
*Killman and Kerst*

July 5, 1955  R. B. MERCHANT  2,712,593
EDGE ILLUMINATED DIAL

Filed April 21, 1951  4 Sheets-Sheet 2

ROBERT B. MERCHANT
*INVENTOR.*

BY
*Killman and Kerst*

July 5, 1955 R. B. MERCHANT 2,712,593
EDGE ILLUMINATED DIAL
Filed April 21, 1951 4 Sheets-Sheet 3

A-A

ROBERT B. MERCHANT
*INVENTOR.*

BY
*Killman and Kerst*

July 5, 1955  R. B. MERCHANT  2,712,593
EDGE ILLUMINATED DIAL
Filed April 21, 1951  4 Sheets-Sheet 4

ROBERT B. MERCHANT
*INVENTOR.*

BY

*Killman and Kerst*

United States Patent Office 2,712,593
Patented July 5, 1955

2,712,593
EDGE ILLUMINATED DIAL

Robert B. Merchant, Glyndon, Md., assignor to Bendix Aviation Corporation, Towson, Md., a corporation of Delaware Application April 21, 1951, Serial No. 222,273

6 Claims. (Cl. 240—2.1)

This invention relates to the illumination of dials, panels, signs and other similar devices for displaying information or producing ornamental effects.

Since the advent of the melamine plastics, there has grown up a practice of edge lighting such devices from one or more sources of illumination concealed from direct view. The light from these sources is led by a series of internal reflections through the dial plate and only emerges as visible light when an irregularity such as an engraved mark is encountered in the surface of the plate.

The usual sources of light for this purpose are of a concentrated form such as, for example, small incandescent bulbs. The use of these sources introduces a difficulty which has never been adequately solved, in that portions of the dial which are close to the source are brightly lighted while portions remote from it are inadequately illuminated unless a larger number of bulbs than would otherwise be required, are employed.

It is an object of this invention to provide means for uniformly illuminating a dial or panel face by edge illumination with a minimum number of light sources;

It is a further object of this invention to provide such a means which does not require complicated additions to the dial structure;

It is another object of the invention to provide such a means which is readily adaptable to different configurations of dial plates and different arrangements of indicia engraved therein.

It is still another object of the invention to provide such a means which may constitute an integral portion of the dial plate itself.

These and other objects and advantages of the invention are realized by a construction in which there is molded at spaced points about the periphery where light sources are to be placed, an arrangement of thickened portions which completely enclose the light source and are shaped to lead light from it to remote portions of the dial plate, bevelled reflecting surfaces at those remote points to reflect the light in a diffused pattern through adjacent portions of the dial plate, and slots formed in the vicinity of the light source to restrict direct light conduction from the source to portions of the dial plate adjacent thereto.

Where the terms "dial" or "dial plate" are used herein they are intended to include panels, signs and similar devices in which illumination is conveyed to indicia on or in the plate from localized sources of light along its edges.

Figure 1:
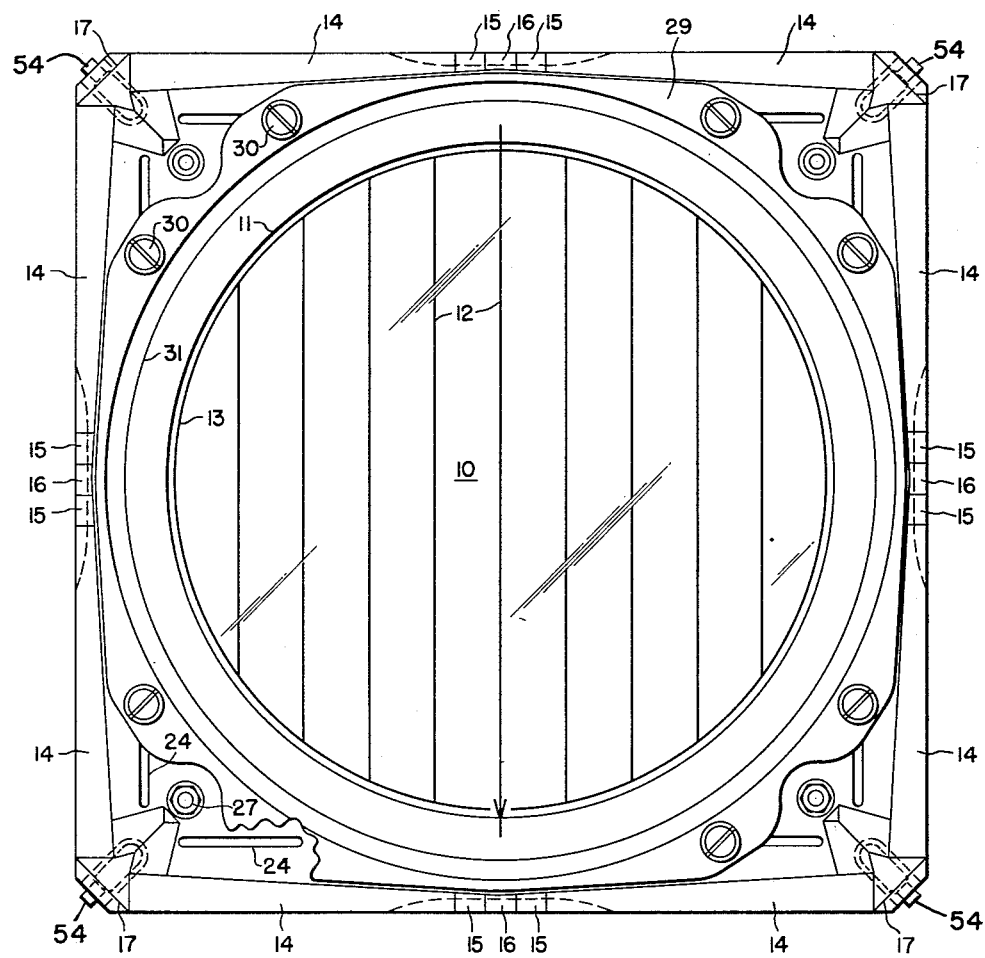
Fig. 1 is a plan view of a dial arrangement embodying the invention.
Figure 2:
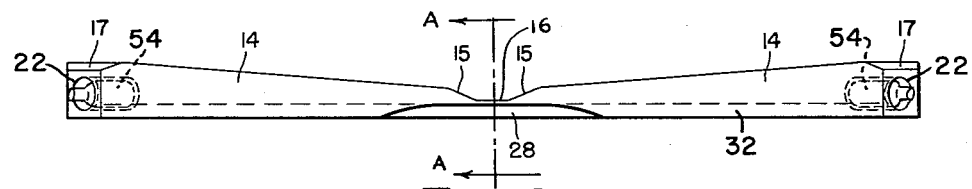
Fig. 2 is a side elevation of the arrangement of Fig. 1.

Referring now more particularly to the drawing, Figs. 1 and 2 illustrate an embodiment of the invention adapted for the illumination of a dial of which the portion visible to an observer is circular in shape. The dial plate 10 may be formed of any of the plastics normally employed for edge lighted dial plates and the visible portion may be of uniform thickness. The visible portion of the dial plate is bounded by the circle 11 and carries a grid of parallel lines 12 bounded by a circular line 13. The grid illustrated is by way of example only, since any desired configuration of lines or arrangement of characters may be employed. The lines, characters or other indicia are preferably engraved into the surface of the dial plate and become visible to an observer by light transmitted from the edge of the plate and passing through the plate without substantial loss until one of the lines or characters are encountered.

Figure 2A:
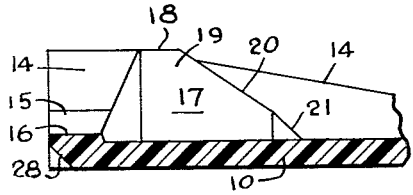
Fig. 2A is a cross-sectional view of a portion of the arrangement as shown in Fig. 2 taken along the line A—A of that figure.

In the arrangement shown, the dial plate is adapted for illumination by four light sources which may be small incandescent bulbs positioned in the four corners of the square dial plate. The dial plate is thickened along its edge by raised portions 14. These portions have their greatest height at the corners of the plate and taper down toward the center portion of the side, terminating in a bevelled face 15. Adjacent bevelled faces 15 are joined by a region 16, the upper surface of which is parallel to the dial plate and raised only slightly therefrom, as shown in Fig. 2A.

As can be seen in Fig. 2, the tapered elements 14 extend from one face of the dial plate only, the opposite face of the dial plate being flat to its edge.

Figure 4:
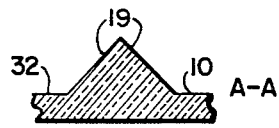
Fig. 4 is a cross-sectional view of a portion of the fragment of Fig. 3 taken along the line A—A.
Figure 3:
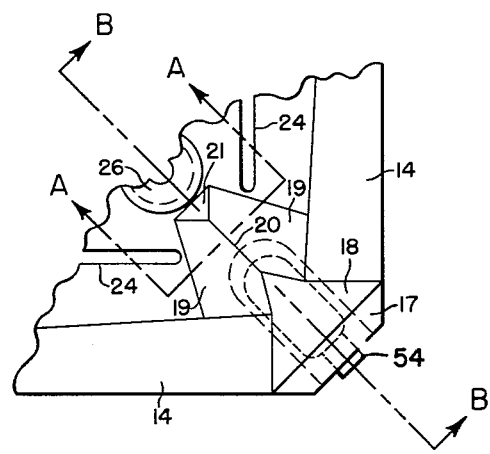
Fig. 3 is a plan view of a corner fragment of the arrangement of Fig. 1.

The tapered elements 14 are joined at each corner of the dial plate by a prism shaped element 17, the upper face of which, as seen in the drawing, has at its maximum thickness the same height as the adjoining ends of the elements 14. The configuration of the element 17 is more clearly shown in Figs. 3, 4, and 5 of the drawing. It will be noted that its upper face 18 is substantially triangular in shape and parallel to the upper surface of the dial plate. The element 17 projects toward the center of the dial from the corner and the portion which is enclosed by the two adjacent elements 14 is of pyramidal shape with two inclined faces 19 rising from the upper surface of the dial plate and terminating in an edge 20 which inclines downwardly toward the dial plate from the face 18. The faces 19, if continued inwardly toward the center of the dial, would terminate in a point. But this point has been removed leaving a bevelled triangular face 21.

Figure 5:
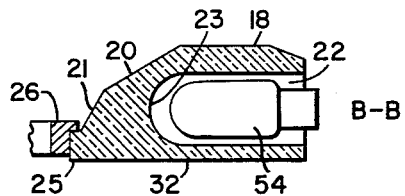
Fig. 5 is a cross-sectional view of a portion of the fragment of Fig. 3 taken along the line B—B.

As shown more clearly in Figs. 2 and 5, a cylindrical bore 22 is formed in each corner of the dial plate penetrating the element 17. Each of these bores houses an incandescent bulb 54 which may be much smaller than the bore. The inner end of the bore is hemispherically rounded as indicated at 23 in Fig. 5 and the bore is highly polished in order that it may transmit, to the dial face, all of the light received from the light source it encloses. The bulb is completely housed in the bore and the outer end of it may be closed by an opaque closure, thus retaining all of the light from the bulb.

An elongated slot 24 is cut through the dial plate parallel to each of the tapered elements 14. Each of the slots 24 is located near a corner of the dial plate, with one end terminating in close proximity to one of the faces 19 of one of the elements 17. A hole 25 extends through the dial plate in each corner thereof, the hole being located directly in front of the face 21 of the element 17 of that corner. The holes 25 may be utilized for securing the dial plate to a supporting structure and for this purpose are illustrated as containing flanged grommets or bushings 26 through which a fastening means 27 is secured.

In the central portion of each side of the dial plate beneath the faces 15 and 16 the lower edge of the dial plate, as seen in Figs. 1, 2 and 2A is bevelled or chamfered as indicated at 28. The bevelled portion is uniform in its mid-section and narrows down to a point in the lower edge of dial plate 10 at both ends.

A metal ring 29 is illustrated which is of larger diameter than the visible portion of the dial plate and is used for securing the latter to supporting structure by means of fastening means 30.

All of the dial plate outside of the visible portion is coated with a reflecting opaque coating 32 which prevents light from being emitted from this region of the dial plate. This coating covers all exposed faces including those of the slots 24.

In operation light from each of the bulbs is transmitted by the walls of the containing bore 18 to the interior of the element 17 and the tapered elements 14 which extend therefrom. The light received by the element 17 is reflected back and forth between the walls 19 and by this means is conducted toward the face 21. Upon striking this face, it is reflected down into the flat portion of the dial plate. Some of the light reflected from the walls 19 is also reflected into the flat portion of the dial plate and the light received from any of these means by the dial plate is then conducted away from the corner toward the central portion of the dial plate. The slots 24 and the bore 25, however, prevent the direct transmission toward the center of the dial of the light which impinges upon them. These interruptions reflect light and by this means the light is diffused so that it leaves the corner region of the dial in a substantially uniform fan of illumination.

Light received by the tapered elements 14 is reflected back and forth between the lateral side walls thereof and also between the upper wall thereof and the lower surface of the dial plate and by successive reflections is led toward the center portion of the side of the dial. As the element 14 tapers down toward this region, the light being conducted by it is concentrated more and more into the flat portion of the dial plate and upon reaching the faces 15 is practically all reflected down into the plate. The light reflected downwardly by the faces 15 impinges upon the bevelled surface 28, which reflects it through the flat portion of the dial plate toward the center of the dial. The tapered ends of the bevel 28 have the effect of causing the light to be fanned out or diffused to make the illumination more uniform.

Some of the light being conducted by the tapered element 14 and being reflected downwardly into the flat portion of the dial plate will begin to travel toward the center of the dial as soon as it leaves the corner. However, this light will be turned back by the slot 24 adjacent thereto and it will not be until the end of the slot has been passed that light from this source can proceed uninterruptedly toward the center of the dial.

Although the embodiment of Fig. 1 has been described as though the dial plate were all in one piece, it can, if desired, be made in two parts with a central circular portion terminating, for example, at the line 31 and being surrounded by the outer annular portion which includes the elements 14 and 17. This arrangement allows for interchangeability of the central visible portion of the dial so that dial plates bearing various arrangements of indicia may be substituted at will. In this case the edge 31 should be lightly sanded to allow the release of the maximum amount of light and the abutting edge of the outer annular portion of the assembly should be highly polished for efficient reception of the light being dissipated from the sanded edge.

In case the assembly is made in two parts, as discussed above, the joint 31 may be covered by opaque gaskets retained by rings such as the metal ring 29 in order to avoid loss of light at the joint.

If desired, the raised portions consisting of the elements 14 and 17 may likewise be made separate from the flat dial plate and may be fastened thereto by transparent cement in accordance with well known practice.

While the arrangement of Fig. 1 illustrates the use of four illumination sources, it should be understood that this number may be varied as desired and that the shape of the assembly need not be square but may assume other polygonal shapes or may have a rounded form if desired.

Figure 6:
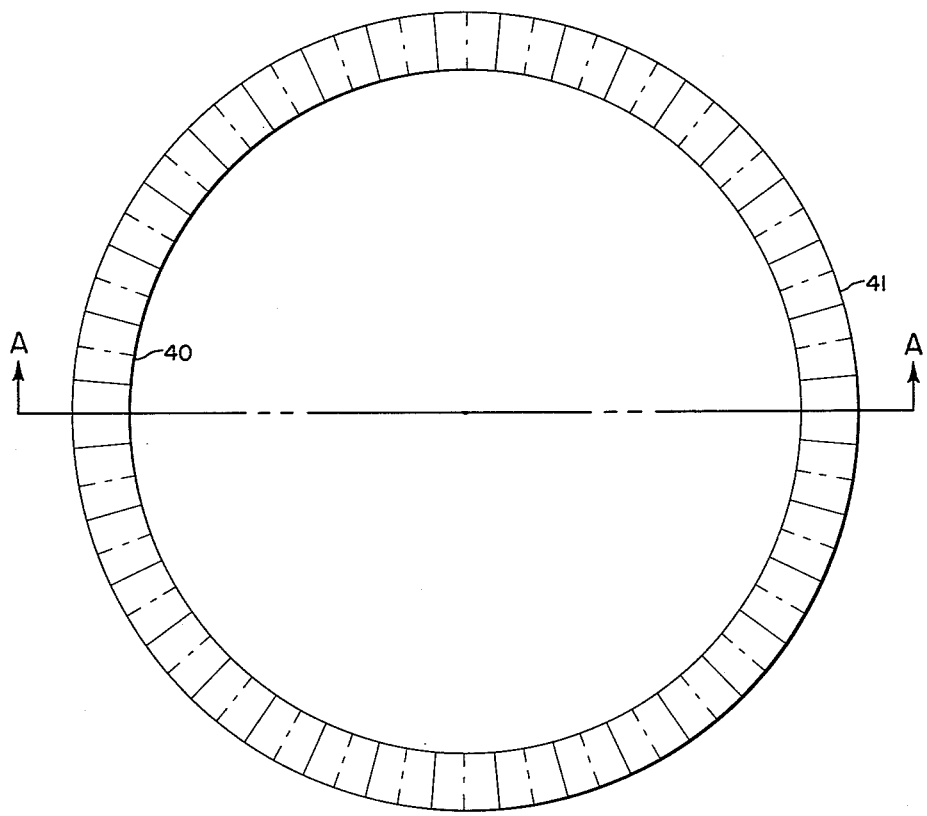
Fig. 6 is a plan view of an annular scale adapted for illumination by the arrangement of Fig. 1.
Figure 7:
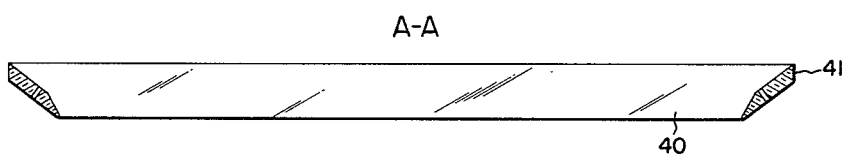
Fig. 7 is a cross-sectional view of the scale of Fig. 6.

In lieu of a solid central dial plate 10, as illustrated in Fig. 1, an annular indicia bearing ring or scale such as illustrated in Figs. 6 and 7 may be substituted. The ring 40 shown in these figures may be made of transparent light conducting plastic material of the same type as used for the assembly of Fig. 1 and may bear any desired engraved indicia. It is shown in Fig. 6 as being marked with azimuth indications. For efficient transfer of light between the two parts of the assembly the outer edge 41 should be polished.

If desired, two assemblies, one being similar to that shown in Fig. 1, and the other utilizing an annular scale of the type shown in Figs. 6 and 7 may be assembled back to back and provision made for the annular orientation of the central portion of the dial plate of the type shown in Fig. 1. The latter dial plate may be made rotatable so that the grid lines may be oriented with respect to the scale as desired.

Figure 8:
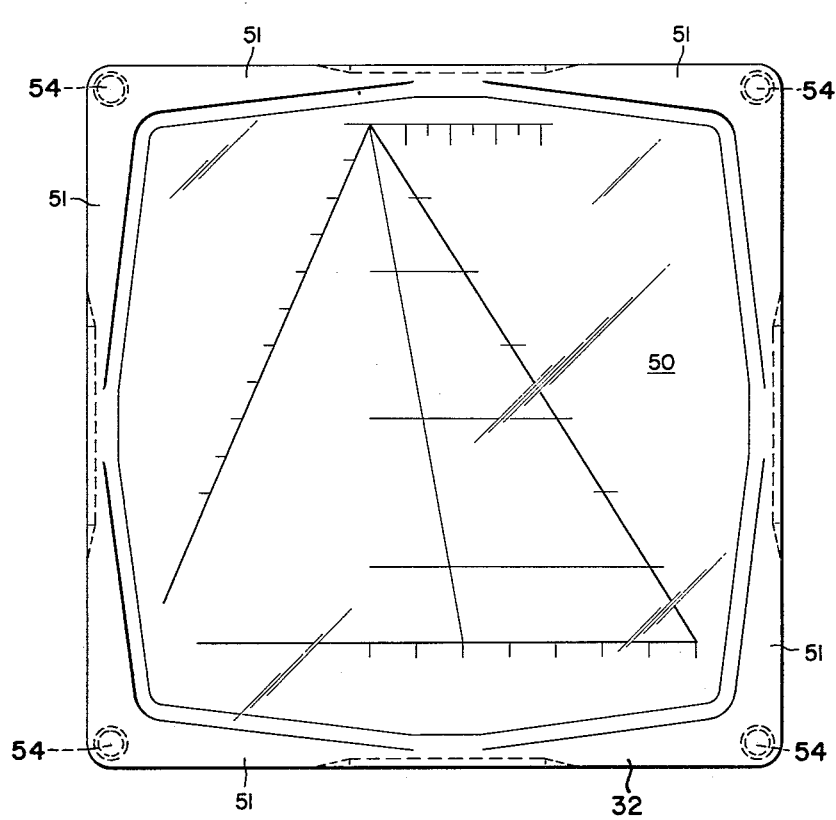
Fig. 8 is a plan view of an arrangement which is an alternative to that of Fig. 1; and, Fig. 9 is a side elevational view of the arrangement of Fig. 8.
Figure 9:
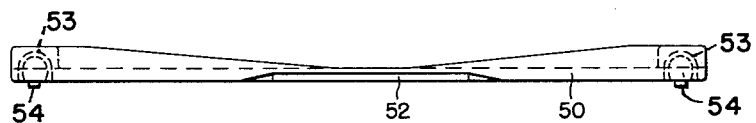

Figs. 8 and 9 illustrate a simplified version of the arrangement of Figs. 1 and 2 which is satisfactory for some types of displays. In this arrangement the whole dial plate 50 is cast or molded as a single piece with raised portions 51 extending from each corner along the side of the upper face of the dial plate. The raised portions 51 taper down toward the level of the upper surface of the flat portion of the dial plate as the central portion of each side is approached. Beneath this central portion of each side is a bevelled region 52 similar to the bevelled region 28 of Figs. 1 and 2. No elements corresponding to elements 17 of Fig. 1 are provided in this version. At the corners bores 53 for housing the light sources 54 are provided extending from the bottom of the dial plate up into the raised portions and completely housing the bulbs used for illumination.

The operation of this embodiment of the invention is similar to that of the embodiment of Figs. 1 and 2. Light from each of the sources is reflected back and forth between the tapered edges of the raised portions 51, some of it continually escaping through the flat plate of the dial toward the center thereof. A great portion of the light is, however, conducted toward the bevelled portions 52 and reflected by those surfaces from the central region of each side of the dial face toward the center of the dial. The raised portions 51 and all the peripheral region of the dial plate are coated with an opaque coating 32 as in the previous embodiments in order that no light may be emitted therefrom and lost. Here again it should be noted that the light source may be completely housed within the dial plate and all of its light be conducted toward the center of the dial.

While the embodiments of the invention illustrated by Figs. 1 to 9 are illustrated with dial plates which are flat in their central portions, they are also applicable to domed dial plates in which the curvature may even be that of a portion of a sphere.

What is claimed is:

1. An edge illuminated dial comprising a dial plate of transparent light conductive material, raised portions formed on one face of said dial plate along the edges thereof, a source of light completely enclosed in each of said raised portions, each of said raised portions tapering from a maximum thickness at the location of its enclosed light source to a minimum thickness at a distance therefrom and adjacent to the corresponding region of minimum thickness of another of said raised portions, the edge of said dial plate on the opposite face thereof from said raised portions being formed between and beneath said adjacent regions of minimum thickness thereof with a flat surface inclined to the median plane of said dial plate by an acute angle and extending from one face of said dial plate to the other, and a layer of opaque material completely enclosing all exposed areas of said raised portions and the edges of said dial plate including said inclined surfaces, whereby light from said sources is conducted along said raised portions into said dial plate between said regions of minimum thickness of said raised portions and is directed through said dial plate toward the center thereof by said inclined flat surfaces.

2. An edge illuminated dial comprising a dial plate of transparent light conductive material of polygonal shape, raised portions formed on one face of said dial plate along the edges thereof, said raised portions having a maximum thickness at the corners of said plate, said raised portions extending from each of said corners with gradually diminishing thickness along each of the sides joined at said corner and being reduced to a minimum thickness in the central portions of said sides, a source of light completely enclosed in each of said raised portions at its region of maximum thickness, the edge of said dial plate on the opposite face thereof from said raised portions being formed in the central portion of each of said sides with a flat surface inclined to the median plane of said dial plate by an acute angle and extending from one face of said dial plate to the other, and a layer of opaque material completely enclosing all exposed areas of said raised portions and the edges of said dial plate including said inclined surfaces, whereby light from said sources is conducted along said raised portions into said dial plate at said central portions of the sides thereof and is directed through said plate toward the center thereof by said inclined flat surfaces.

3. An edge illuminated dial comprising a dial plate of transparent light conducting material of polygonal shape, raised portions formed on one face of said dial plate along the edges thereof, said raised portions having a maximum thickness at the corners of said plate and extending from each corner to points near the center of each side of said plate, the thickness of said raised portions being progressively reduced from said corners to said points, said raised portions at the corners of said dial plate each comprising an arm extending from the corner toward the center of said dial plate and tapering down to the surface of said dial plate at a distance from said corner, said dial plate being interrupted by a pair of slots near each corner thereof, each of said slots extending parallel to a respective edge of said dial plate and terminating short of said arm, said slots interrupting the passage of light through said dial plate through said corners toward the center thereof, and said raised portions conducting light away from said corners and into said dial plate throughout their length.

4. An edge illuminated dial comprising a dial plate of transparent light conductive material formed with a circular opening in its central portion, an annular member of transparent light conductive material having substantially the same outer diameter as the diameter of said opening and having at its outer periphery substantially the same thickness as said plate, said member being positioned in said opening with its peripheral surface juxtaposed to the periphery of said opening, said member having indicia engraved therein, the peripheral edge of said member being polished and the abutting peripheral edge of said opening being roughened, raised portions formed on one face of said dial plate along the edges thereof, a source of light completely enclosed in each of said raised portions, each of said raised portions tapering from a maximum thickness at the location of its enclosed light source to a minimum thickness at a distance therefrom and adjacent to the corresponding region of minimum thickness of another of said raised portions, the edge of said dial plate on the opposite face thereof from said raised portions being formed between and beneath said adjacent regions of minimum thickness thereof with a flat surface inclined to the median plane of said dial plate by an acute angle and extending from one face of said dial plate to the other, and a layer of opaque material completely enclosing all exposed areas of said raised portions and the edges of said dial plate including said inclined surfaces, whereby light from said sources is conducted along said raised portions into said dial plate between said adjacent regions and is directed through said plate toward the center thereof by said inclined flat surfaces.

5. An edge illuminated dial comprising a dial plate of transparent light conducting material of polygonal shape, raised portions formed on one face of said dial plate along the edges thereof, said raised portions having a maximum thickness at the corners of said plate and extending from each corner to points near the center of each side of said plate, the thickness of said raised portions being progressively reduced from said corners to said points, said raised portions at the corners of said dial plate each comprising an arm extending from the corner toward the center of said dial plate and tapering down to the surface of said dial plate at a distance from said corner, said dial plate being interrupted near each of said corners by an opening located between said corner and the center thereof, said dial plate being further interrupted by a pair of slots near each of said corners, each of said slots extending parallel to a respective edge of said dial plate and terminating adjacent to the arm and the opening located near said corner, said openings and said slots interrupting the passage of light through said dial plate from said corners toward the center thereof, and said raised portions conducting light away from said corners and into said dial plate throughout their length.

6. An edge illuminated dial comprising a dial plate of transparent light conducting material of polygonal shape, raised portions formed on one face of said dial plate along the edges thereof, said raised portions having a maximum thickness at the corners of said plate and extending from each corner to points near the center of each side of said plate, the thickness of said raised portions being progressively reduced from said corners to said points, said raised portions at the corners of said dial plate each comprising an arm extending toward the center of said dial plate, said arm having substantially the form of a three-sided pyramid having one side coextensive with said one surface of said dial plate, having its base joined to said raised portion, and its apex directed toward the center of said plate, said dial plate being interrupted near each of said corners by an opening located between said corner and the center thereof, said dial plate being further interrupted by a pair of slots near each of said corners, each of said slots extending parallel to a respective edge of said dial plate and terminating adjacent to the arm and the opening located near said corner.

References Cited in the file of this patent

UNITED STATES PATENTS

| Number | Name | Date |
|---|---|---|
| 2,347,665 | Christensen | May 2, 1944 |
| 2,430,862 | Carseallen | Nov. 18, 1947 |
| 2,523,290 | Gardner | Sept. 26, 1950 |
| 2,561,885 | Prideaux | July 24, 1951 |
| 2,566,026 | Hughes | Aug. 28, 1951 |

FOREIGN PATENTS

| Number | Country | Date |
|---|---|---|
| 31,104 | France | Aug. 31, 1926 |